(12) United States Patent
Drew et al.

(10) Patent No.: US 8,108,409 B2
(45) Date of Patent: Jan. 31, 2012

(54) DETERMINING TOP COMBINATIONS OF ITEMS TO PRESENT TO A USER

(75) Inventors: Julie W. Drew, Palo Alto, CA (US); Juan Antonio R. Garay, Palo Alto, CA (US); Krishna Venkatraman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 11/880,390

(22) Filed: Jul. 19, 2007

(65) Prior Publication Data
US 2009/0024624 A1    Jan. 22, 2009

(51) Int. Cl.
G06F 7/00    (2006.01)
G06F 17/30   (2006.01)

(52) U.S. Cl. .......................... 707/750; 707/776; 707/797

(58) Field of Classification Search .................. 707/2, 3, 707/6, 102, 705, 750, 776, 797; 705/10
See application file for complete search history.

(56) References Cited

U.S. PATENT DOCUMENTS

| | | | |
|---|---|---|---|
| 5,813,003 A * | 9/1998 | Chen et al. ........................ | 707/6 |
| 6,138,117 A | 10/2000 | Bayardo | |
| 6,385,608 B1 * | 5/2002 | Mitsuishi et al. ................ | 707/6 |
| 6,397,221 B1 * | 5/2002 | Greef et al. .................... | 707/102 |
| 6,665,669 B2 | 12/2003 | Han et al. | |
| 6,832,216 B2 * | 12/2004 | Shintani et al. ................... | 707/2 |
| 7,007,020 B1 * | 2/2006 | Chen et al. ........................ | 707/6 |
| 7,194,477 B1 * | 3/2007 | Bradley et al. ................ | 707/102 |
| 7,249,057 B2 * | 7/2007 | Hatakama et al. .............. | 705/26 |
| 7,370,033 B1 * | 5/2008 | Roychowdhury ................ | 707/3 |
| 7,490,075 B2 * | 2/2009 | Lind et al. .............. | 707/999.001 |
| 2002/0143587 A1 * | 10/2002 | Champernowne ................ | 705/5 |
| 2003/0088491 A1 * | 5/2003 | Liu et al. .......................... | 705/36 |
| 2003/0217055 A1 * | 11/2003 | Lee et al. .......................... | 707/6 |
| 2004/0024686 A1 * | 2/2004 | Sandholm et al. .............. | 705/37 |
| 2005/0044087 A1 * | 2/2005 | Li et al. ......................... | 707/100 |
| 2005/0044094 A1 * | 2/2005 | Li et al. ......................... | 707/101 |
| 2005/0183087 A1 * | 8/2005 | Kubota ......................... | 718/100 |
| 2006/0106665 A1 * | 5/2006 | Kumar et al. .................. | 705/10 |
| 2006/0136589 A1 * | 6/2006 | Konig et al. .................. | 709/224 |
| 2006/0167839 A1 * | 7/2006 | Lind et al. ......................... | 707/2 |
| 2007/0094067 A1 * | 4/2007 | Kumar et al. .................. | 705/10 |
| 2007/0100680 A1 * | 5/2007 | Kumar et al. .................. | 705/10 |
| 2008/0201340 A1 * | 8/2008 | Thonangi ...................... | 707/100 |

OTHER PUBLICATIONS

He, Zengyou "Mining Top-k Approximate Frequent Patterns", arXiv.org, Cornell University Database, (Mar. 17, 2005),13 pgs.
Burdick, et al., "MAFIA: A Maximal Frequent Itemset Algorithm" *IEEE Transaction on Knowledge and Data Engineering*, vol. 17, No. 11, (Nov., 2005),15 pgs.

* cited by examiner

*Primary Examiner* — Phong Nguyen

(57) ABSTRACT

Embodiments of the present invention pertain to determining top combinations of items to present to a user. According to one embodiment, data that includes information describing a plurality of combinations of records is accessed. Each record describes a plurality of items. The data is analyzed using a branch and bound search procedure to determine top combinations of items based on a specified metric and a specified number. According to one embodiment, the metric is value enabled and the specified number determines how many combinations of items are associated with the top combinations of items.

25 Claims, 5 Drawing Sheets

DETERMINING TOP COMBINATIONS OF ITEMS TO PRESENT TO A USER

TECHNICAL FIELD

Embodiments of the present invention relate to determining combinations of items. More specifically, embodiments of the present invention relate to determining top combinations of items to present to a user.

BACKGROUND ART

Many companies that sell products have sales organizations that interact with potential customers to determine what combinations of products the customers are interested in. For example, a sales representative A may interact with a customer B to determine that customer B is interested in buying a combination of products that include a particular type of server SV1, a particular type of memory M1, and software S1 and S2 and sales representative C may interact with customer D to determine that customer D is interested in buying a combination of products that include a particular type of server SV2, a particular type of memory M1, and software S2 and S3.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

As already described herein, many past approaches to determining what combinations of products customers are interested in has been a highly customized approach where sales representatives work with each customer to determine from scratch what products the customer is interested in. According to one embodiment, historical order data is analyzed to determine potential combinations of products to present to a future customer. For example, historical order data includes orders that past customers have been interested in.

According to one embodiment, the historical order data is analyzed to determine the top combinations of products that have been ordered most frequently or that generated the most revenue, among other things. The top combinations of products can be used as default product configurations that can be presented to one or more users, thus reducing the amount of effort involved in determining combinations of products to present to a user.

A System for Determining Top Combinations of Products to Present to a User

Figure 1:
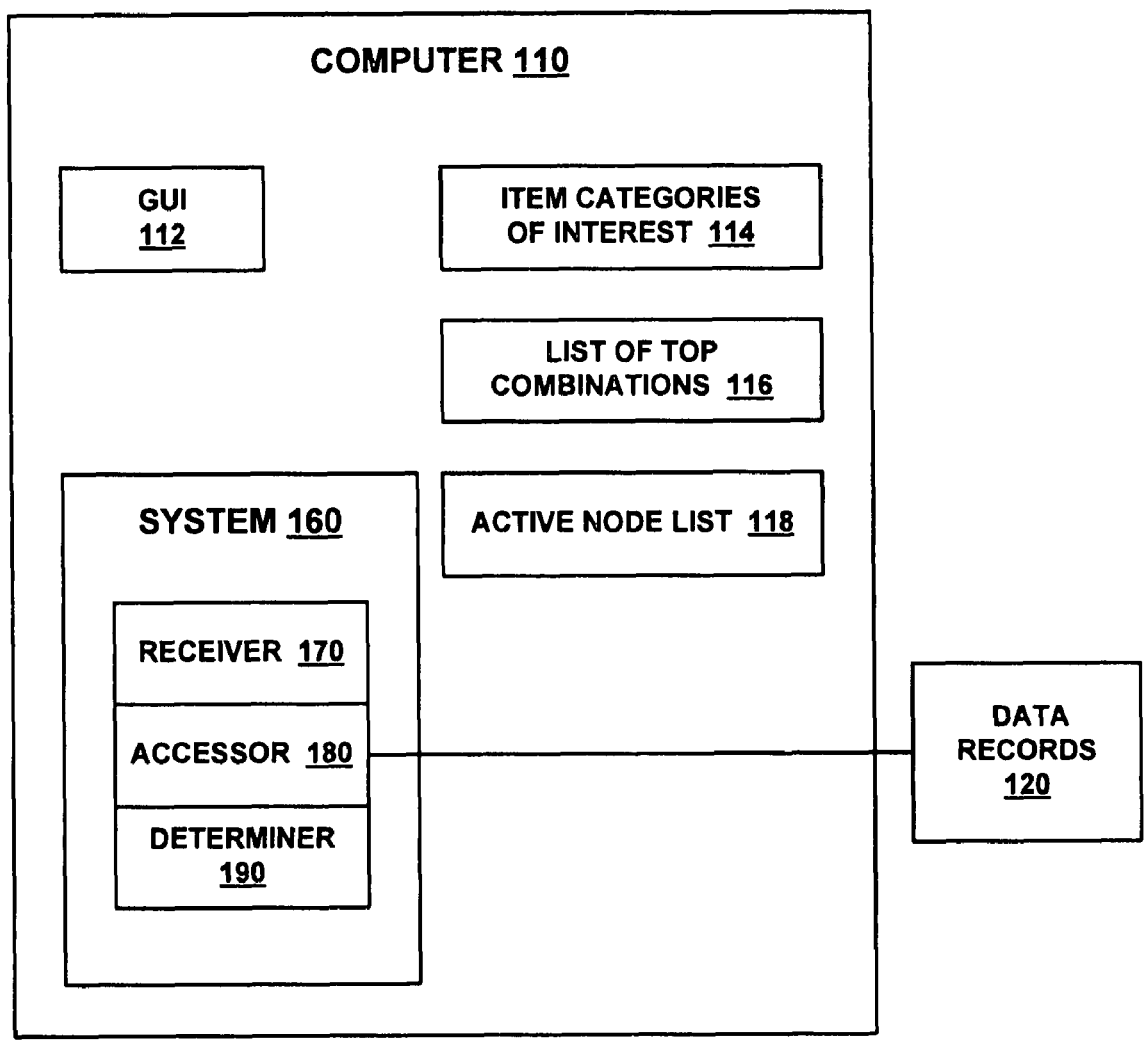
FIG. 1 is a block diagram of a system for determining top combinations of items, according to one embodiment.

FIG. 1 is a block diagram of a system for determining top combinations of products to present to a future customer, according to one embodiment. The system 160 can be executed on a computer system 100. The system 160 includes an accessor 180 for accessing historical order data 120, a receiver 170 for receiving a metric and a number, and a determiner 190 for determining top combinations of products. The computer system 110 can also include a graphical user interface 112 (GUI) for entering the metric and the number. The GUI 112 can also be used for entering product categories of interest 114. The computer system 100 may include a list of top combinations 116 (also referred to herein as "top list") and an active node list 118, as will become more evident.

Assume for the sake of illustration that a user entered the number 100, the metric "frequency" into the GUI 112, and product categories of interest 114 that include CPU, memory, and software. The receiver 170 associated with the system 160 receives the metric and the number from the GUI 112. The receiver 170 may also receive the product categories of interest 114. The historical order data 120 can include many orders that customers have made over the course of a long period of time. The accessor 180 associated with the system 160 can access the historical order data 120 to retrieve the order data that includes orders for CPU, memory, or software, or a combination thereof. The historical order data 120 can include orders that were actually made by customers or orders that customers were considering but ended up not making.

Continuing the example, according to one embodiment, the determiner 190 uses the active node list 118 and the top list 116 to determine the top 100 combinations of products that occurred most frequently in the historical order data 120. The active node list 118 is used as a part of creating a branch and bound tree, as will become more evident, and the top list 116 is used to track what combinations of products occurred most frequently. When processing has completed, the top list 116 will include the top combinations of products to present, for example, to a future customer. Each such combination will include one product from each of the user's selected categories: CPU, memory and software, according to one embodiment. Continuing the example, the results will be the 100 most frequently occurring combinations of products in these categories.

Although many of the embodiments are described in the context of products or product combinations that are presented to customers, various embodiments are well suited to other applications, such as determining whether a document has been plagiarized. The terms "item" and "record" shall be used to generalize the concepts of "product" and "order" discussed previously. A record includes information pertaining to a group of one or more items, as will become more evident. Examples of items, include, but are not limited to products, product categories, sentences, and words. Examples of records include, but are not limited to, orders, web pages, and documents. Other applications of various embodiments shall be described in more detail hereafter.

The blocks depicted for system 160 represent features of the system 160. The blocks that represent features of system 160 can be arranged differently than as illustrated, and can implement additional or fewer features than what are described herein. Further, the features represented by the blocks in system 160 can be combined in various ways. The system 160 can be implemented using software, hardware, firmware, or a combination thereof.

The system 160 includes a metric and number of combinations of items receiver 170 (also referred to herein as a "receiver"), a data accessor 180 (also referred to herein as an "accessor"), and a top combinations of items to present determiner 190 (also referred to herein as a "determiner"). The receiver 170, the accessor 180 and the determiner 190 may be coupled to each other in various ways. The data accessor 180 is configured for accessing data describing a plurality of combinations of items. The historical order data 120 is one example of data that the data accessor 180 may access. In another example, the data accessor 180 may access data that includes a plurality of sentences from one or more documents as a part of determining whether a document has been plagiarized. The receiver 170 is configured for receiving a metric and a number. The determiner 190 is configured for determining the top combinations of items using a branch and bound search procedure to analyze the data based on the metric and the number. The metric is value enabled, according to one embodiment. The number is used as a part of determining how many combinations of items are associated with the top combinations of items.

Item Value and Record Value

As mentioned previously, a record includes information describing a group of one or more items. Each item may have a value associated with it in a particular record. For example, the value associated with an item-record pair may be the revenue or margin associated with the item and record. The value associated with the item-record pair may have units of dollars, such as revenue or margin, or it may have different units.

In addition, each record may have its own associated value. Examples of a record's value include but are not limited to units of dollars, such as margin, revenue, or different units. An example of a non-dollar value is importance of the record.

The value associated with a record may or may not be related to the value associated with item-record pairs for items in that record. Consider an example in which a record represents an order and an item represents a product. In this case, each order may have a value representing the total revenue of the order. This total revenue may be the sum of the individual revenues for each item in the order. For other examples of metrics, there may be no relationship or a different relationship between the record value and item-record pair values.

Metrics

As already stated, according to one embodiment, the orders that past customers have made are analyzed to determine what combinations of products that have been ordered most frequently or that have generated the most revenue, among other things. Order frequency or revenue generated are examples of "metrics" that can be used in measuring combinations of items with respect to the historical order data. A combination of items may have one or more associated metrics. A metric for a given combination of items is related to the values of records and item-record pairs, according to one embodiment.

One class of metrics, called value-enabled metrics, is based on the values of records containing the item combination, according to one embodiment. For example, a value-enabled metric for a given item combination may be equal to the sum of record values for records containing the item combination.

In one embodiment, the value associated with each record is 1. For a given item combination, the value-enabled metric may be equal to the sum of record values for records containing the item. For example, the value enabled metric equals the number of records containing the item. For this choice of record value, the value-enabled metric is called "frequency" because it corresponds to the number of records containing the item combination. For example, assume that record 1 includes items A, B, C, and D and record 2 includes items A, B, C and E. According to one embodiment, the metric "frequency" for combination A, B, C would equal 2, since the combination A, B, C appears in both records.

In another example, items represent products, the records represent orders, and an order's value is equal to the revenue of the order. Then the value-enabled metric for a product combination equals the total revenue of orders containing the product combination, which is called revenue-enabled by the product combination. Consider the above example in which items correspond to products and records correspond to orders, and the value represents revenue of an order. Then the metric "revenue enabled" for product combination A, B, C would include the revenue of order 1 and the revenue of order 2, in one embodiment.

In another embodiment, the items represent products, the records represent orders, and an order's value is equal to the margin of the order. In this case, the value-enabled metric for a product combination may be the total margin of orders containing the product combination, which is called margin-enabled by the product combination, Another class of metric, called value-generated metric, is based on the item-record values for records containing the item combination and items in the combination. A value-generated metric for a given item combination may be equal to the sum of values of item-record pairs for records containing the item combination and items in the combination.

In one embodiment, the items represent products, the records represent orders, and a product-order value is equal to the revenue of the product in the order. Then the value generated metric for a product combination represents the sum of the product-order revenue of products in the combination, for orders containing the product combination. The value generated metric for this embodiment is called revenue-enabled by the item combination. Consider again the example involving orders 1 and 2 and products A through E. Each product-order combination has a value that represents revenue of the product in the order. The metric "revenue generated" for product combination A, B, C would equal the revenue of products A, B, C in order 1 plus the revenue of products A, B, C in order 2, in one embodiment.

A margin-enabled metric can be defined similarly by letting the product-order value represent the margin of the product in the order. The cost would be subtracted from the revenue as a part of determining the margin.

Thus, frequency, revenue enabled, and margin enabled are examples of value enabled metrics. Revenue generated and margin generated are examples of value generated metrics. Although many of these examples pertain to monetary examples, embodiments are well suited to other types of values besides monetary. Therefore, value enabled and value generated can also refer to other types of value besides monetary value.

Items and Combinations of Items

According to one embodiment, an item is an individual product. Each item may have a category. For example, the categories may represent product categories, such as CPU, memory, software, and so on. A combination of items is a combination of individual products. A combination may have a specified number of products, or a combination of items that contains one item from each of a number of specified categories. The receiver 170 may receive a list of one or more categories that should be represented in the resulting combinations, or it may not receive categories and instead receive a number of products that should be in each of the resulting combinations, according to one embodiment.

According to another embodiment, the term "item" shall represent a product category, and a combination of items represents a combination of product categories. The receiver 170 may receive a number of categories that should be in each of the resulting combinations.

Branch and Bound Search Procedure

According to one embodiment, a type of branch and bound search procedure is used as the search procedure for analyzing the historical order data 120. Conventional branch and bound algorithms are used to find a single solution to a problem. In contrast, the branch and bound search procedure used according to one embodiment finds a specified number of top combinations of items from the historical order data for a specified metric. The branch and bound search procedure creates a tree like structure of nodes where each node (except for the root node) represents a combination of one or more items. The root node represents an empty set. For a given node, the number of items in its associated combination is equal to the number of links in its path from the root, according to one embodiment.

Figure 2:
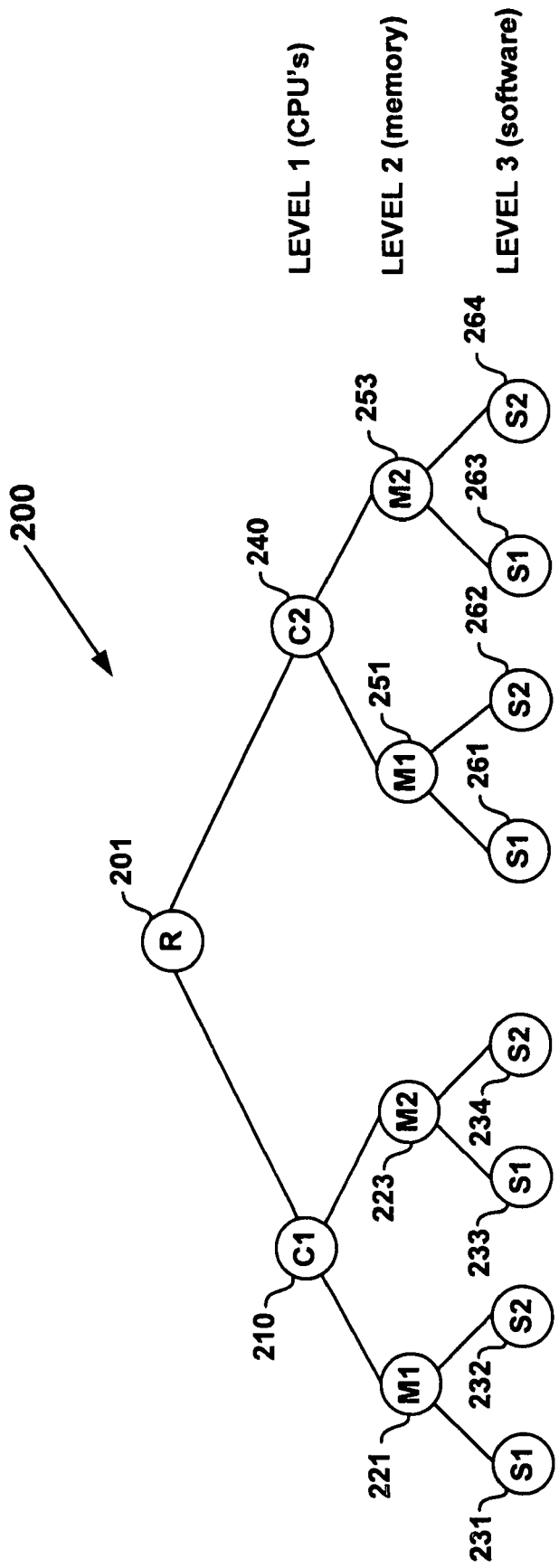
FIG. 2 depicts a tree that is created by a branch and bound search procedure for specified product categories of interest, according to one embodiment.

FIG. 2 depicts a tree 200 that is created by a branch and bound search procedure for finding combinations of products, in which each combination represents one product from each of the specified product categories of interest, according to one embodiment, in which items correspond to products. Assume that the product categories of interest 114 were CPU, memory, and software. Each level of the tree corresponds to one of the product categories of interest 114. For example, level 1 corresponds to CPU, level 2 corresponds to memory, and level 3 corresponds to software. As depicted in FIG. 2, the types of CPUs are C1 and C2. The types of memory are M1 and M2. The types of software are S1 and S2. For example, each leaf corresponds to a combination of one CPU, one memory product, and one software product. For each leaf, there may be one or more orders that pertain to its associated combination. In this case, leaf 231 represents combination C1, M1, and S1, leaf 232 represents combination C1, M1, S2, and leaf 264 represents combination C2, M2, S2. Assume that an order 1 is for C1, M1, S1, order 2 is for C2, M2, S2, and order 3 is for C1, M1, S1, S2. In this case, order 1 pertains to leaf 231, order 2 pertains to leaf 264, and order 3 pertains to leaves 231 and 232. According to one embodiment, a root of a tree is not one of the levels of the tree.

All combinations of items are considered while creating a tree even if those combinations do not actually occur, according to one embodiment. For example, consider an embodiment in which items correspond to products, and product categories are specified. In this example, assume that level 1 corresponds to base systems and that there are two base systems BS1 and BS2. Assume that level 2 corresponds to CPUs and there are three CPU types C1, C2, and C3. However, base system BS1 is never built with C3 and BS2 is never built with C2. The branch and bound search procedure, according to one embodiment, searches the historical order data for the combinations BS1, C3 and BS2, C2. However, no orders will be found for the combinations BS1, C3 and BS2, C2 and no nodes or leaves will be created for them.

Nodes are instantiated for combinations of items that are found as a part of the search, according to one embodiment. For example, assume that the historical order data 120 only includes order 1 (C1, M1, S1), order 2 (C2, M2, S2), and order 3 (C1, M1, S1, S2). According to one embodiment, the tree 200 would include nodes 201, 210, 221, 231, 232, 240, 253 and 264. However, nodes 223, 233, 234, 251, 261, 262, and 263 would not be instantiated.

Figure 3:
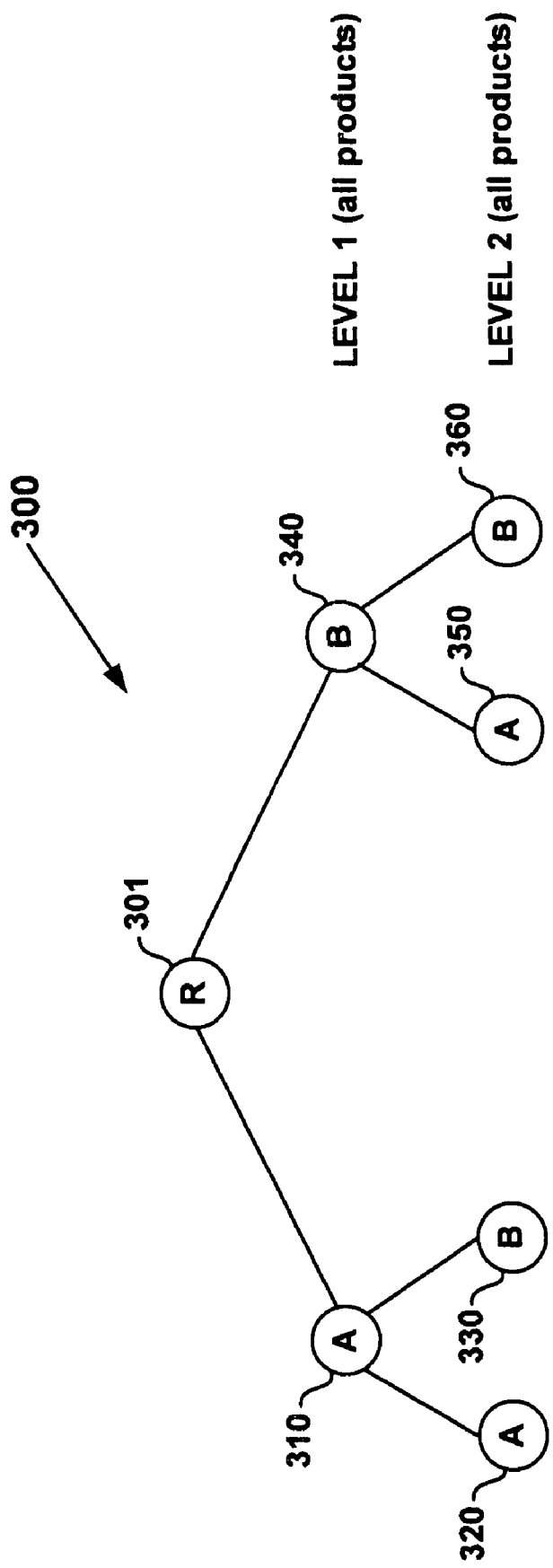
FIG. 3 depicts a tree that is created by a branch and bound search procedure for all products, according to one embodiment.

According to another embodiment, top combinations of products are determined without specification of product categories. For example, FIG. 3 depicts a tree 300 that is created by a branch and bound search procedure for all products, according to one embodiment. All products are specified at each level, according to one embodiment. For example, assume that all of the products sold by a company include product A and product B. Level 1 and level 2 both specify all of the products. In this approach, nodes and leaves may be pruned to eliminate duplication. For example, nodes 301, 310, 320, 330, 340, and 360 would be instantiated. However, node 350 would not be instantiated since it includes the same combination of products A and B that node 330 includes. Other nodes depicted in tree 300 may also not be instantiated depending on what combinations of products are found in the historical order data.

Various methods of ordering the products can be used to prevent nodes or leaves that represent duplicate products from being instantiated. For example, assume that the products are ordered alphabetically A, B, C. In this case, the branch and bound search procedure would branch only on products greater than the previous product in the ordering. Referring to FIG. 3, since A is not greater than B, the branch and bound search procedure would not branch to A resulting in BA at node 350 from B at node 340. Other methods of ordering, such as a random order, can also be used.

Upper Bound

As a part of determining the specified number of top combinations of items for a specified metric, an upper bound for the specified metric is associated with each node, according to one embodiment. As discussed previously, for the two classes of metrics value-enabled and value-generated, different upper bounds are computed.

Assume for the sake of illustration that items correspond to products, and the user wants to find the top 100 combinations of products that occur most frequently in the historical order data 120. Thus the metric being used is frequency, which is an example of a value-enabled metric. Determining how frequently the combination C1 M1, as represented by node 221, actually occurs would entail finding the number of orders that include both C1 and M1, which is an intensive computation. A less intensive computation would be to calculate the minimum of the number of orders that include C1 and the number of orders that include M1 and use this calculation as an upper bound for how frequently the combination of products C1 and M1 occur. The upper bound will be greater than or equal to a metric, such as the actual number of orders that include both C1 and M1, according to one embodiment. Assume for example that 10 orders include C1 and 20 orders include M1. In this case, the frequency upper bound for C1, M1 would be the minimum of 10 and 20 which is 10. A notation for the frequency upper bound for C1 and M1 could be "upper bound=min (frequency (C1), frequency (M1))." More generally, the frequency upper bound associated with a node would be the minimum of the frequency of a node's parent node and the frequency of the one product (or item) associated with the node and not associated with the parent node. For example, the frequency upper bound for node 231 could be "upper bound=min (frequency (C1, M1), frequency (S1))."

The "upper bound=min (frequency (C1, M1), frequency (S1))" is an example of an upper bound for the frequency metric. There are other upper bounds for the frequency metric, according to one embodiment. For example, for a given combination, one could compute the minimum over all pairs of products in the combination of the frequency of that product pair. This calculation could be used as an upper bound for how frequently the combination of products occurs. Consider for example combination C1, M1, S1. Then the frequency metric for C1, M1, S1 is less than the minimum of the three quantities: frequency of (C1, M1), frequency of (C1, S1), frequency of (M1, S1). By precomputing the frequency of product pairs after loading the order data and before running the branch and bound search procedure, repeated computations can be saved. In practice, many product pairs will have zero frequency, which helps to significantly reduce the size of the tree, according to one embodiment.

The product pair frequencies can be used in conjunction with other upper bounding procedures. For example, the frequency upper bound for node 231 could be computed as "upper bound=min (frequency (C1, M1), frequency (S1), frequency (C1, S1), frequency (M1, S))" which uses the product pair frequencies to further tighten the upper bound, according to one embodiment.

The preceding illustration for the frequency metric exemplifies how upper bounds for value-enabled metrics can be computed. In one example, an upper bound is computed based on the value enabled metric for a given node to be equal to the minimum of the value enabled metric for the parent node and the minimum of the value enabled metric for the item associated with the node and not with the parent node. In another example, an upper bound is computed based on the value enabled metric to be the minimum value enabled over all item pairs associated with the node. A third embodiment computes the upper bound as the minimum of the two preceding upper bounds.

For example, in the case of revenue enabled, the upper bound associated with a node would be the minimum of the revenue enabled of a node's parent node and the revenue enabled of the one product (or item) associated with the node and not associated with the parent node. In a specific example, assume there is a parent node for (cpu1, memory3) with child node (cpu1, memory3, disk1). The revenue enabled upper bound for the child node could be computed as min(RevEnabled (cpu1, memory3), RevEnabled (disk1)), according to one embodiment.

Continuing the same example, the revenue enabled for each product pair can also be used to compute upper bound on revenue enabled. The revenue enabled could be pre-computed for each product pair. Then the upper bound min(RevEnabled (cpu1, memory3), RevEnabled (cpu1, disk1), RevEnabled (memory3, disk1)) can be used. Although precomputation may be CPU intensive, it will probably result in tighter bounds.

In a third variation on this example, the two previous upper bound computations can be combined to compute a tighter upper bound: The revenue enabled upper bound for the child node could be computed as min(RevEnabled (cpu1, memory3), RevEnabled (disk1), RevEnabled (cpu1, disk1), RevEnabled (memory3, disk1)).

Margin enabled upper bound can be computed in a similar manner as revenue enabled upper bound, however, according to one embodiment, the cost would be subtracted from the revenue as a part of determining a margin.

According to one embodiment, metrics at nodes are non-increasing as one follows any path down the tree. For example, the parent node's metric value is greater than each of its children nodes' metric value. However, the value generated metric may not be non-increasing along a path down the tree. For example, consider the revenue generated metric as an example of a value generated metric. If the lowest level of a tree corresponds to the most expensive product category, the revenue generated may increase along a path (or part of a path) down the nodes of the tree. In order to have a non increasing metric as the process proceeds down the nodes of the tree, maximum value generated is used as an alternative metric for value generated, according to one embodiment. The maximum value generated for a node and its associated item combination is the value generated by item-record pairs for items in the combination in all records which contain the item combination, plus for each category not yet represented in the item combination, the maximum value generated by any single item in that category in records containing the combination, according to one embodiment. For example, referring to tree 200 (FIG. 2), assume the value generated metric corresponds to revenue generated in this example. Observe that node 221 represents product combination C1, M1. Assume that the combination C1, M1 appears in orders 1 and 3. The maximum revenue generated for node 221 would include the revenue generated by products C1, M1 in orders that contain both of those products (orders 1 and 3) plus the maximum revenue generated by any single software product in orders 1 and 3. An example of notation for orders containing an item combination C1, M1 is Orders (C1, M1). An example of a notation for maximum revenue generated is MaxRevenue (C1, M1)=Revenue (C1, M1)+MaxRevenue (for Categories lower than (C1, M1) on tree, Orders (C1, M1)). At the leaves, maximum revenue generated is equal to revenue generated, according to one embodiment.

An upper bound for maximum value generated can be computed, according to one embodiment. In one embodiment, this upper bound of maximum value generated at a node is equal to the value generated at the parent node, plus the value generated by the item in the node that is not in the parent node, plus for each lower category in the tree, the maximum revenue generated by any single item in the category over all records. For example, referring to tree 200 (FIG. 2) the upper bound for node 221 would include the revenue generated for the parent node 210 (C1) plus the revenue generated for the new product M1 plus the maximum revenue generated by all products in the categories below node 221, which in this example includes S1 and S2. An example of a notation for the upper bound on maximum revenue generated is Revenue (C1)+Revenue (M1)+MaxRevenue (for Categories lower than (C1, M1) on tree, All orders).

Margin generated upper bound can be computed in a similar manner as revenue generated upper bound. However, the cost would be subtracted from the revenue as a part of determining a margin, according to one embodiment. Both are examples of value generated upper bounds.

Active Node List

An active node list 118 is used as a part of creating a tree, according to one embodiment. Assume for example, that the active node list 118 as depicted in Table 1 is used as a part of creating the tree 200 depicted in FIG. 2. For the sake of simplicity, the active node list depicted in Table 1 depicts entries for every node that could be in the active node list. However, in practice, entries for every node may not be associated with the active node list at the same time. For example, an entry for a child node may not be in the active node list at the same time that entries for its parent or any ancestor node are in the active node list.

TABLE 1

Active node list for tree 200 depicted in FIG. 2.

Root
C1
C2
C1 + M1
C1 + M2
C2 + M1
C2 + M2
C1 + M1 + S1
C1 + M1 + S2
C1 + M2 + S1
C1 + M2 + S2
C2 + M1 + S1
C2 + M1 + S2
C2 + M2 + S1
C2 + M2 + S2

An entry for the root is placed at the top of the active node list 118, according to one embodiment. Then entries for the combinations of items for the various levels can be associated with the active node list 118. For example, C1 and C2 are associated with level 1, C1+M1, C1+M2, C2+M1 and C2+M2 are associated with level 2 and so on for level 3.

The entries associated with the active node list 118 can be ordered in many different ways, which affects the order that nodes and leaves are created, as will become more evident. For the sake of simplicity, assume that the entries are ordered as depicted in Table 1. An entry is removed from the active node list 118 and used to instantiate a node. Since all trees include a root, the root's entry is removed from the active node list 118 first, according to one embodiment, and a root node is created. Subsequent nodes such as nodes 210, 240 and so on can be created by removing a corresponding entry from the active node list 118 and creating a node.

List of Top Combinations

The leaves of a tree represent combinations of items that conform to the user inputs. In one embodiment, the receiver 170 receives a list of item categories. In this embodiment, the leaves represent item combinations having one item in each category. According to one embodiment, the receiver 170 receives a number describing the desired number of items in each top combination. Then the leaves represent combinations having the received number of items. A list of top combinations 116 is used to maintain the identities and metrics for the number of combinations the user is interested in. As will become more evident, entries for various leaves associated with a tree and metrics for these leaves are added to the top list 116, according to one embodiment. The list of top combinations 116 shall also be referred to as "the top list." For example, if the user specified that they are interested in 100 combinations, then the list of top combinations 116 would be used to maintain the identities and metrics of the best 100 combinations as represented by leaves.

Figure 5:
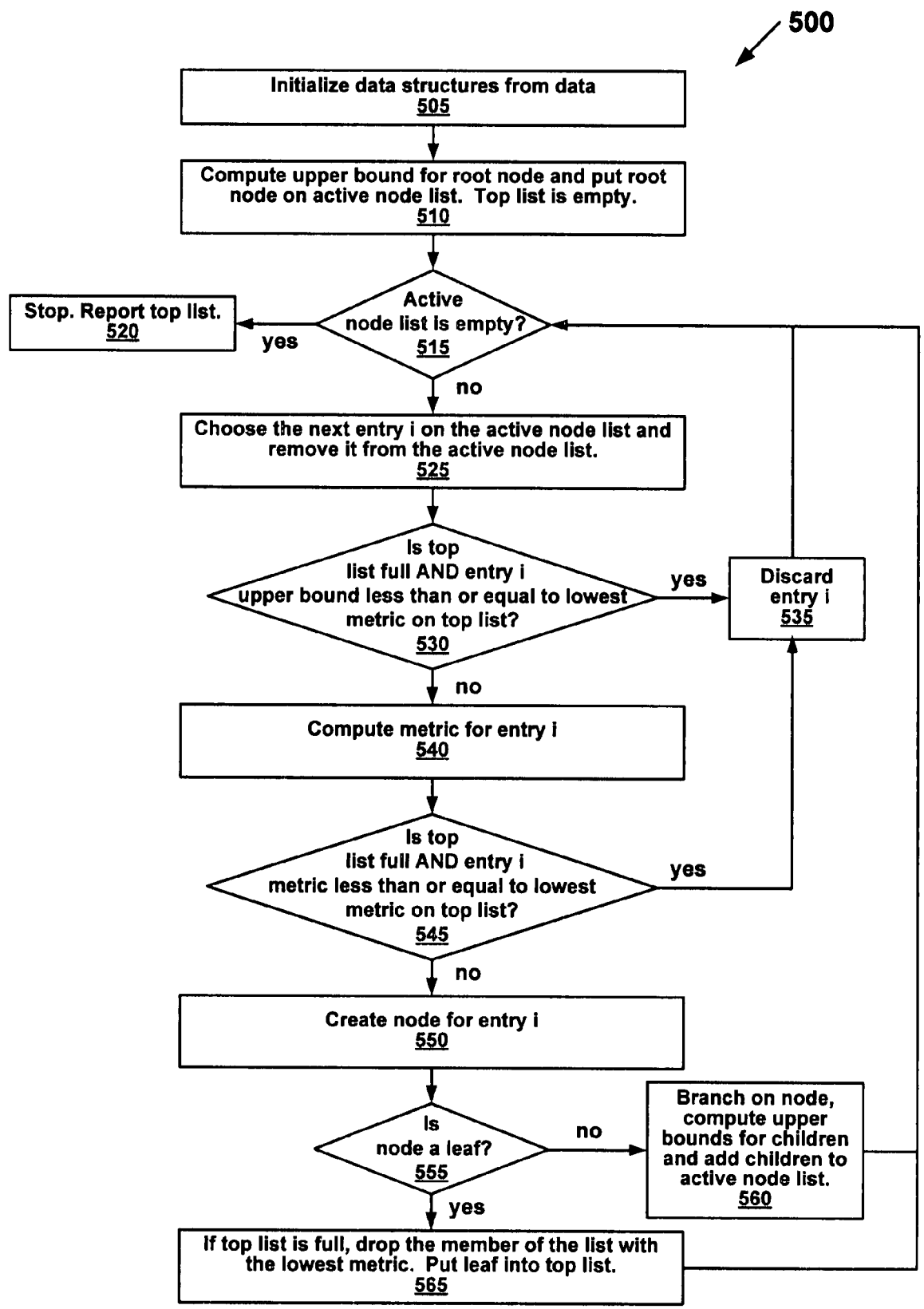
FIG. 5 depicts a flowchart of a method for associating entries with a top list as a part of creating a tree structure, according to one embodiment.

FIG. 5 depicts a flowchart 500 of a method for associating entries with a top list as a part of creating a tree structure, according to one embodiment. Data structures are initialized based on data, such as historical order data (505). The upper bound for the root node is computed and added to an active node list 118 (510). If the active node list 118 is empty (515) then processing ends and the top list 116 contains the top combinations of products, according to one embodiment. If the active node list is not empty (515) processing proceeds to 525 where an entry is obtained from the active node list 118. At 530 if the top list 116 is full and the entry i's upper bound is less than or equal to the lowest metric associated with the top list 116, then entry i is discarded (535). For example, assume that the upper bound for node 221 is 8 and the lowest metric for the list 116 is 10, then the node 221 will not be created and its associated metric will not be added to the active node list 118. Because, according to one embodiment, the metric of any node or leaf below 221 on the tree cannot be greater than the metric of 221, no descendent of 221 can have a metric higher than 8. Therefore, node 221 or its descendents are not considered, according to one embodiment.

If the determination at 530 is false, a metric is computed for entry i (540). If the top list 116 is full and entry i's metric is less than or equal to the lowest metric associated with the top list 116 (545), then entry i is discarded (535); otherwise a node is created for entry 1 (550). If the created node is a leaf (555), an entry for the leaf and its associated metric, which was computed at 540, are added to the top list 116. If the top list 116 is full, the entry with the lowest metric associated with the top list 116 is deleted from the top list 116 (565) to make room for the leaf that was just added. In one embodiment, a leaf and its associated metric are added to the top list 116 in a manner that maintains the order of the metrics. For example, assume that the metric for the new leaf is 13 and the metrics for the last 3 entries of the top list 116 are 14, 12 and 10. An entry for the new leaf will be added between the 14 and the 12, for example, at step 565, and the entry for the metric 10 will be removed, for example, at 530 and 532.

If the node is not a leaf (555), then processing branches on the node, upper bounds for the node are computed, and entries for the node's children are added to the active node list (560). For example, assume the upper bound for node 221 is 12 and the lowest metric for the top list 116 is 10, the actual metric for node 221 is computed. If the actual metric for node 221 is 11, then branching occurs on node 221 and entries for its children are added to the active node list 118, according to one embodiment. Processing from 560 and 565 proceed to 515 to determine if the active node list is empty. As already stated, when processing ends at 520, the top list 116 will include the top combinations of products.

Filters

According to one embodiment, filters can be used as a part of determining what information describing combinations of items from accessed data, such as historical order data, will be analyzed. For example, a user can choose to filter data based on customer, region, country, how large a customer is, industry verticals, date of orders, among other things.

According to one embodiment, the system can filter the historical data based on whether an order has at least one item for each category that was specified, or whether an order has a user specified number of items. For example, orders that do not contain at least one item from the specified categories will not produce valid combinations, and so they can be excluded. In another embodiment, orders that do not contain at least the user specified number of items in each combination will not produce valid combinations, and so they can also be excluded.

Ways of Ordering Entries Associated with an Active Node List

As already stated, the entries associated with the active node list 118 can be ordered in many different ways, which affects the order that nodes and leaves are created and affects the efficiency of performing a search. According to one embodiment, the active node list 118 is ordered by the depth of a node with a tree. For example, referring to FIG. 2, the leaves 231, 232, 233 234, 261, 262, 263, and 264 have a depth of 3, the nodes 221, 223, 251, 253 have a depth of 2, nodes 210 and 240 have a depth of 1 and so on. The active node list 118 may be ordered to instantiate leaves as quickly as possible, thus, resulting in the list of top combinations 116 being filled as quickly as possible.

According to another embodiment, the active node list 118 may be ordered according to upper bounds associated with the potential nodes thus causing nodes with higher upper bounds to be created first. In yet another embodiment, a two-phased approach may be used, where the phase depends on whether the top list is full. Depth may be used during the first phase of the branch and bound search procedure, followed by upper bound in the second phase or upper bound may be used in the first phase and then depth in the second phase. According to yet another embodiment, the entries in the active node list 118 may be ordered first by depth then by upper bound as depicted in Table 2. In still another embodiment, the entries in the active node list 118 may be ordered first by upper bound and then by depth as depicted in Table 3.

TABLE 2

Active node list ordered by depth with upper bound as a tie breaker

| Depth | Upper bound |
|---|---|
| 3 | 12 |
| 3 | 8 |
| 3 | 5 |
| 3 | 1 |
| 2 | 40 |
| 2 | 30 |
| 2 | 20 |

TABLE 3

Active node list ordered by upper bound with depth as a tie breaker

| Upper bound | Depth |
|---|---|
| 12 | 3 |
| 12 | 2 |
| 10 | 3 |
| 9 | 2 |
| 8 | 1 |

According to one embodiment, an ordering as depicted in Table 2 may be used for a first phase. The ordering may be switched to an ordering as depicted in Table 3 during a second phase.

OTHER APPLICATIONS OF VARIOUS EMBODIMENTS

Although many of the embodiments are described in the context of products, product combinations, product categories, or combinations of product categories that are presented to customers, various embodiments are well suited to other applications, such as determining whether a document has been plagiarized, determining which products to place near each other in a grocery store, determining what products to offer as "cross-sell" items with a customer's order, determining how frequently products are purchased or which products result in the highest revenue when people purchase the products with their credit cards. The term "item" shall be used to refer to anything that can be analyzed to determine top combinations of those items. Examples of items, include, but are not limited to products, product combinations, product categories, combinations of product categories, sentences, and words.

A historical order, which contains one or more items, is one example of a record. Other examples of records may include the set of items purchased together in a grocery transaction, the set of sentences in a document, the set of vendors on a credit card statement, the set of telephone numbers dialed in one day from a particular telephone, among other things. The data may be stored in a database where each record represents an order for products, a document, a grocery transaction, and so on.

A Method of Determining Top Combinations of Items

Figure 4:
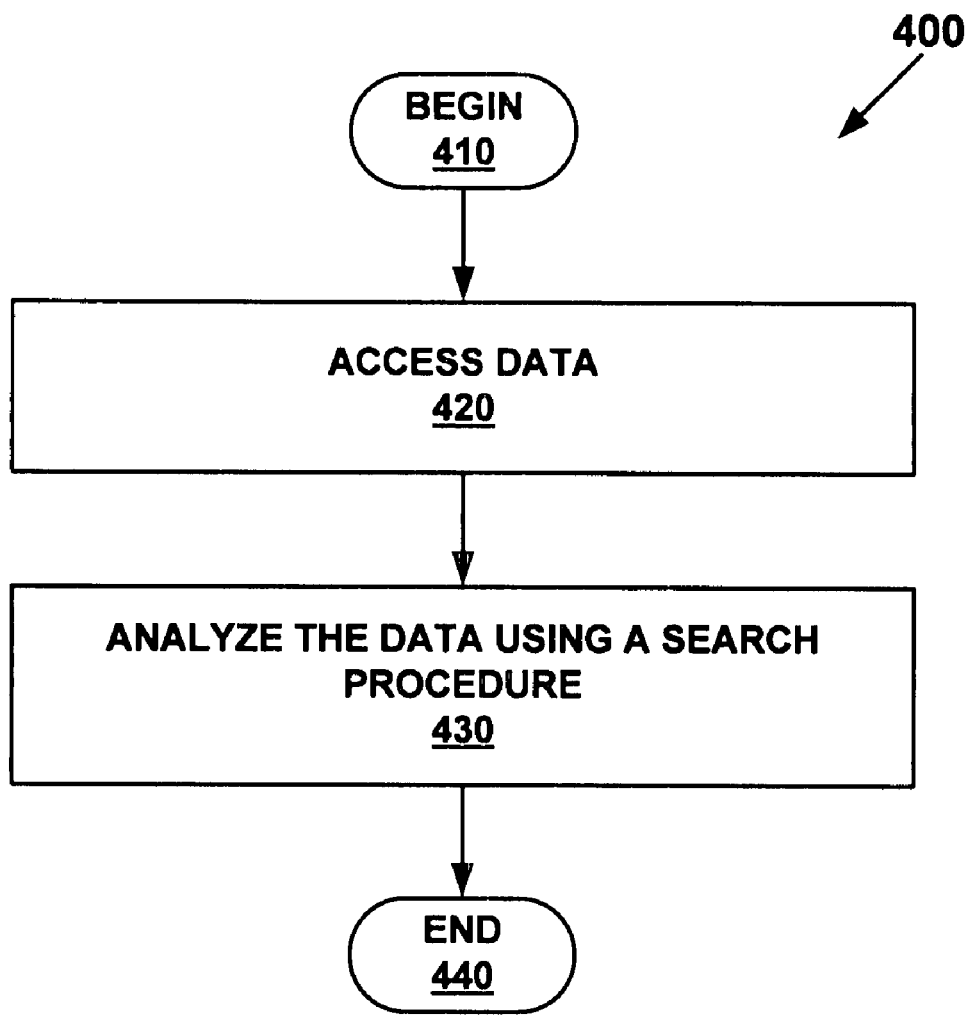
FIG. 4 is a flowchart for a method of determining top combinations of items, according to one embodiment.

FIG. 4 is a flowchart for a method of determining top combinations of items, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the embodiments described by flowchart 400 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the processor of the computer system. When executed, the instructions cause the computer system to implement the functionality of the present invention as described below.

Assume for the sake of illustration, that the items in question are products and that the records are historical orders. Also assume that the user specified that they are interested in the top 3 (the user specified number) combinations of products that include a CPU, memory, and software product (the product categories of interest 114) that have the highest frequency (the user specified metric). Also assume for the sake of illustration that the historical order data includes the orders as depicted in Table 4.

TABLE 4 historical order data and associated leaves.

| Order No. | Products in Order | Associated Leaf/leaves |
|---|---|---|
| 1 | C1, M1, S1 | 231 |
| 2 | C2, M2, S2 | 264 |
| 3 | C1, M1, S1, S2 | 231, 232 |
| 4 | C1, M2, S1, C2, M1 | 231, 233, 261, 263 |
| 5 | C2, M1, S2, M2, S1 | 261, 262, 263, 264 |
| 6 | C1, M2, S2 | 234 |

The first column of Table 4 designates the order number, the second column designates the combination of items contained in each order, and the third column designates the leaf or leaves that correspond to the order. Historical order data in this illustration would include data depicted in the second column. Further, in this illustration, the leaves depicted in the third column would be derived from the historical order data depicted in the second column, as will become more evident.

To facilitate discussion, Table 5 depicts leaves and metrics associated with the top list 116 at various points in time.

TABLE 5

Top list at various points in time

| Time | Leaf/Leaves | Metric |
|---|---|---|
| T + 1 | 231 | 3 |
| T + 2 | 231 | 3 |
|  | 232 | 1 |
| T + 3 | 231 | 3 |
|  | 232 | 1 |
|  | 233 | 1 |
| T + 4 | 231 | 3 |
|  | 261 | 2 |
|  | 232 | 1 |
| T + 5 | 231 | 3 |
|  | 261 | 2 |
|  | 263 | 2 |

In preparation for flowchart 400, a metric and a number are received. The historical order data 120 includes information describing combinations of products that past customers have ordered. The historical order data 120 can be searched to determine a number of potential combinations of products for a metric to present to a future customer. For example, a user may interact with a GUI 112 (FIG. 1) to enter a metric, such as frequency, that they are interested in and a number, such as 3, that represents how many combinations of products will be associated with the top combinations 116. The receiver 170 associated with system 160 receives the user specified metric and the user specified number. The receiver 170 may also receive the product categories of interest 114 which in this illustration are CPU, memory and software.

In step 410, the method begins.

In step 420, data that includes information describing a plurality of combinations of items is accessed. The accessor 180 associated with system 160 accesses the historical order data 120, which includes a plurality of orders. The orders describe a plurality of combinations of items. In one embodiment, the historical order data 120 is used to find orders that include one or more products from each of the categories that are of interest. Data structures are populated based on the historical order data 120. These data structures can be used repeatedly to determine among other things how many orders contain a particular combination of products. The phrase "using the historical order data" or "analyzing historical order data" shall, according to one embodiment, include the population of these data structures based on the historical order data and referring to the data structures.

Assume that the orders that include products from each of the categories of interest are depicted in Table 4. Orders from the historical order data 120 that do not contain at least one product from each of the categories of interest are not considered. In other embodiments, in which categories of interest are not specified, but instead, the number of items in each combination is specified, orders are excluded if they do not contain at least the specified number of items desired in each combination.

In step 430, the data is analyzed using a search procedure to determine top combinations of items. The determiner 190 associated with the system 160 analyzes the historical order data 120 using a branch and bound search procedure to determine the top combinations of items 116. In this example, the top combinations of items 116 will include 3 combinations of products based on the user specified number.

Initially, the active nodes list 118 is empty, the top list 116 is empty, and the lowest metric associated with the top list 116 is set to negative infinity. The top list 116 has a maximum size of 3, which corresponds to the user specified number. An entry for the root is added to the active node list 118. Assume for the sake of illustration that the active node list 118 is ordered to achieve maximum depth for the tree 200 (FIG. 2) as quickly as possible. For example, the active node list 118 would be ordered to create the nodes of tree 200 (FIG. 2) in the following order, according to one embodiment: root 201, node 210, node 221, leaf 231, leaf 232, node 223, leaf 233, leaf 234 and so on.

Entries are removed from the active node list 118. Corresponding nodes or leaves are created for the entries as dictated by the method, according to their upper bounds and metrics. Assume that the root 201, node 210, and node 221 have been created and that the active node list contains entries corresponding to nodes 231 (upper bound 3, depth 3), 232 (upper bound 3, depth 3), 223 (upper bound 4, depth 2) and 240 (upper bound 3, depth 1). The next entry, corresponding to 231 (FIG. 2), is obtained from the active node list and removed from the active node list. The historical order data 120 is analyzed for the product combination C1, M1 and S1 and its metric is computed to be 3. The leaf 231 (FIG. 2) is created. Referring to Table 5, at time t+1, an entry for leaf 231 is added to the top list 116 along with its metric 3.

The next entry from the active node list, corresponding to 232 (FIG. 2), is obtained and removed from the list. The historical order data 120 as depicted in the second column of Table 4 is analyzed for products C1, M1, S2. One order is found that includes C1, M1 and S2 as displayed in order no. 3 for Table 4. Leaf 232 (FIG. 2) is created and an entry for leaf 232 is added to the top list 116 along with the metric 1 at time T+2 as depicted in Table 5.

The next entry from the active node list, corresponding to node 223 (FIG. 2), is removed from the active node list. The metric for this entry is computed to be 2 and node 223 is created. Since 223 is not a leaf, the node 223 is branched upon, and its children, corresponding to nodes 233 and 234, are added to the active node list, both entries with upper bound 2 and depth 3. In one embodiment, the ordering of the active node list is determined by depth then by upper bound, and so in this case the entries on the active node list are ordered: 233, 234, 240.

The next entry on the active node list, corresponding to node 233 (FIG. 2), is removed. The historical order data 120 as depicted in Table 4 is analyzed based on the products C1, M2, S1 corresponding to node 233. One order is found that includes products C1, M2 and S1 as displayed in order no. 4 in Table 4. Leaf 233 (FIG. 2) is created for C1, M2, S1 with metric 1 since its combination appears in 1 order (order no. 4 of Table 4). Referring to Table 5, at time T+3 the top list 116 includes entries for leaf 231, leaf 232 and leaf 233 with respective frequencies of 3, 1 and 1. The top list 116 is now full.

The next entry on the active node list, corresponding to node 234 (FIG. 2), is removed. Its upper bound, 2, is greater than the lowest metric 1 for the top list 16 at depicted in Table 5 at time T+3. The metric for C1, M2, S2 is computed because the upper bound of 2 for products C1, M2, S2 is higher than the lowest metric (Table 5 at time T+3). The metric for combination C1, M2, S2 is 1. Since the metric for C1, M2, S2 is not higher than the top list 116's lowest metric of 1 for leaf 233 at time T+3 depicted in Table 5, leaf 234 is not created nor is an entry corresponding to it added to the top list 116.

The next entry on the active node list, corresponding to node 240, is removed. The upper bound for combination consisting only of product C2 is computed to be 3 since there are three orders (order nos. 2, 4, and 5 of Table 4) containing that product. The upper bound is greater than the lowest metric 1 on the top list, and so the metric for C2 is computed. Its metric is also equal to 3. The node 240 is created and then branched upon, so that entries corresponding to nodes 251 and 253 are added to the active node list, both with upper bounds 3 and depth 2.

The next entry on the active node list, corresponding to node 251, is removed. Since the upper bound of 3 for combination C2, M1 is greater than the lowest metric 1 on the top list, the metric for node 251 is computed. Its metric is 2 since the combination C2, M1 appears in two orders (order nos. 4 and 5 of Table 4). Since its metric is greater than the lowest metric on the top list, node 251 is created and then branched upon, and entries for node 251's two children (leaves 261 and 262) are added to the active node list 118. In one embodiment, ordering on the active node list can be determined by depth and then upper bound.

Consider item combination C2, M1, S1 corresponding to node 261. C2, M1 is associated with 2 orders (order nos. 4 and 5 of Table 4), S1 is associated with 4 orders (order nos. 1, 3, 4 and 5 of Table 4), and S2 is associated with 4 orders (order nos. 2, 3, 5, and 6 of Table 4). The upper bound for combination C2, M1, S1 (leaf 261) is min(frequency (C2, M1), frequency (S1))=min(2,4)=2. The upper bound for combination C2, M1, S2 (leaf 262) is min(frequency (C2, M1), frequency (S2))=min(2,4)=2. Since both leaves 261 and 262 have the same depth and the same upper bound, their ordering can be arbitrary. Assume leaf 261 precedes leaf 262 on the list.

The entry corresponding to leaf 261 (FIG. 2) is obtained and removed from the active node list. Since the upper bound for leaf 261 is greater than the lowest metric (metric of 1 for leaf 232) on the top list, the metric for leaf 261 is computed. Since its metric, 2, is greater than the lowest metric on the top list, leaf 261 is created and added to the top list, and an entry for the combination on the top list with the lowest metric, corresponding to leaf 233, is removed. Thus, at time T+4, the top list contains entries for leaves 231, 261 and 232 with respective metrics 3, 2, and 1 as depicted in Table 5.

The next entry on the active node list, corresponding to node 262, is obtained and removed from the active node list. Since its associated product combination C2, M1, S2 has an upper bound of 2 and its upper bound is greater than the lowest metric on the top list, its metric is computed. Its metric is computed to be 1 because the combination C2, M1, S2 appears only in order no. 5 (Table 4.) Therefore, it is not worthy of the top list, so the leaf is not created and an entry corresponding to it is not added to the top list.

Processing continues so that node 253, corresponding to combination C2, M2, is created. Its metric is 3 because it appears in 3 orders (order nos. 2, 4, and 5 in Table 4), and thus the metric is greater than the lowest metric (1) on the top list at time T+4. Thus it may contain descendants that are worthy of the top list. Processing branches on node 253 and entries corresponding to leaves 263 and 264 are added to the active node list. Both have the same depth and upper bound 3.

The entry corresponding to node 263 is obtained and removed from the active node list. The historical order data 120 is analyzed based on the products C2, M2, S1 corresponding to leaf 263. Two orders (order nos. 4 and 5) are found to contain C2, M2, S1 and so the metric for leaf 263 is 2. The leaf 263 is therefore worthy of the top list 116 whose lowest metric at time T+4 is 1. The entry for leaf 232 is deleted from the top list and an entry for leaf 263 is added to the top list. At time T+5, the top list contains entries for leaves 231, 261 and 263 with respective metrics 3, 2, and 2 as depicted in Table 5.

The entry corresponding to leaf 264 (products C2, M2, S2) is obtained from the active node list. The upper bound of 3 for the product combination C2, M2 and S2 means that it may be worthy of the top list. Referring to Table 5, the lowest metric associated with the top list 116 at time t+5 is 2. Since 3 is higher than the lowest metric, the metric for leaf 264 (FIG. 2) is computed by searching the historical order data 120 and finding the number of orders that include the product combination C2, M2, S2. Two orders (order nos. 2 and 5 of Table 4) contain this combination. Since 2 is not greater than the lowest metric at time T+5, leaf 264 is not created and an entry for leaf 264 is not added to the top list.

In step 440, the method ends.

Although many of the embodiments herein were described in which items corresponded to computer related products, the various embodiments can be used for any type of item. For example, various embodiments could be used in the automotive industry.

Various embodiments have been described in various combinations. However, any two or more embodiments may be combined. Further, any embodiment may be used separately from any other embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of determining top combinations of items, the method comprising:
    accessing, performed by a computer system, data that includes information describing a plurality of records, wherein each record describes a plurality of items; and
    analyzing, performed by the computer system, the data using a branch and bound search procedure to determine top combinations of items based on a specified metric and a specified number, the metric is value enabled and the number of combinations of items associated with the top combinations of items is equal to the specified number and the specified number is specified prior to the analyzing of the data using the branch and bound search procedure, wherein the analyzing of the data further comprises that for each node, which represents one or more of the items, associated with a tree structure computing an upper bound for the specified metric.

2. The method as recited by claim 1, wherein the value enabled metric associated with an item combination represents its frequency of occurrence in the records.

3. The method as recited by claim 1, wherein the value enabled metric is revenue enabled.

4. The method as recited by claim 1, wherein the value enabled metric is margin enabled.

5. The method as recited by claim 1, wherein the method further comprises:
creating a tree structure based on the data, wherein each level of the tree structure is associated with a category of an item.

6. The method as recited by claim 1, wherein the method further comprises:
creating a tree structure based on the data, wherein each level of the tree structure is associated with all items.

7. The method as recited by claim 1, wherein the method further comprises:
creating a tree structure based on the data using the branch and bound search procedure, wherein a value enabled upper bound on a node associated with the tree structure is computed based on a minimum of a value enabled of the node's parent node and a valued enabled of an item associated with the node but not associated with the node's parent node.

8. The method as recited by claim 1, wherein the method further comprises:
creating a tree structure based on the data using the branch and bound search procedure, wherein a value enabled upper bound on a node associated with the tree structure is computed based on a minimum of a value enabled by each pair of items associated with the node.

9. The method as recited by claim 1, wherein the method further comprises:
precomputing the value enabled by each pair of items.

10. A system of determining top combinations of items to present to a user, the system comprising:
a processor;
a data accessor configured for accessing data that includes information describing a plurality of records, each record describes a plurality of items;
a metric and number of combinations of items receiver configured for receiving a metric and a number; and
a top combinations of items for value enabled to present determiner configured for determining the top combinations of items using a branch and bound search procedure to analyze the data based on the metric and the number, wherein the metric is value enabled and wherein the number of combinations of items associated with the top combinations of items is equal to the specified number and the specified number is specified prior to the analyzing of the data using the branch and bound search procedure, wherein the branch and bound procedure analysis of the data further comprises computing for each node, which represent one or more of the items, associated with a tree structure an upper bound for the specified metric.

11. The system of claim 10, wherein the system receives one or more user specified categories and the top combinations of items for value enabled determiner is configured to determine the top combinations of items based on the user specified categories.

12. The system of claim 10, wherein the system creates a tree structure based on the data and wherein nodes and leaves that represent duplicate combinations are not instantiated.

13. The system of claim 10, wherein the system creates a tree structure based on the data and wherein leaves associated with the tree structure represent combinations that conform to user specified categories.

14. The system of claim 10, wherein the system creates a tree structure based the data and wherein the system receives a number that determines a number of levels associated with the tree structure and a number of items associated with leaves of the tree structure.

15. The system of claim 10, wherein the items correspond to products and the data includes an order selected from a group consisting of an order that was placed by a customer and an order that a customer was considering.

16. A computer-usable medium having computer-readable program code stored therein for causing a computer system to perform a method of determining top combinations of items to present to a user, the method comprising:
receiving a metric and a number for determining what top combinations of items would be most appropriate to present to the user, wherein the number determines how many combinations of items are associated with the top combinations of items and wherein the metric is value generated;
accessing data that includes the information that describes combinations of items; and
analyzing the data using a branch and bound search procedure based on the metric and the number to determine the top combinations of Items, the number of combinations of items associated with the top combinations of items is equal to the specified number and the specified number is specified prior to the analyzing of the data using the branch and bound search procedure, and the analyzing of the data further comprises computing for each node, which represent one or more of the items, associated with a tree structure an upper bound for the specified metric.

17. The computer-usable medium of claim 16, wherein the computer-readable program code stored therein causes a computer system to perform the method, and wherein the method further comprises:
creating a tree structure based on the data using the branch and bound search procedure, wherein a maximum value generated metric is used to compute a value generated metric on a node associated with the tree structure and wherein the maximum value generated metric for the node is value generated by the item combination associated with the node, plus for each lower level of the tree structure, a maximum value generated by any single item for the category at that level among all records containing the item combination associated with the node.

18. The computer-usable medium of claim 17, wherein a maximum value generated upper bound a node associated with the tree structure is computed based on value generated at the node's parent, plus value generated by an item associated with the node and not associated with the node's parent, plus for each lower level of the tree structure, a maximum value generated by any single item for the category at that level among all records.

19. The computer-usable medium of claim 16, wherein the computer-readable program code stored therein causes a computer system to perform the method, and wherein the analyzing of the historical data further comprises:
    analyzing the data based on the value generated, wherein the value generated is margin generated.

20. The computer-usable medium of claim 16, wherein the computer-readable program code stored therein causes a computer system to perform the method, and wherein the method further comprises:
    creating a tree structure based on the data using the branch and bound search procedure, wherein the branch and bound search procedure uses depth of nodes to order two or more entries associated with an active node list.

21. The computer-usable medium of claim 16, wherein the computer-readable program code stored therein causes a computer system to perform the method, and wherein the method further comprises:
    creating a tree structure based on the data using the branch and bound search procedure, wherein the branch and bound search procedure uses upper bounds on metrics of nodes to order two or more entries associated with an active node list.

22. The computer-usable medium of claim 16, wherein the computer-readable program code stored therein causes a computer system to perform the method, and wherein the method further comprises:
    analyzing the data based on the value generated, wherein the value generated is revenue generated.

23. The computer-usable medium of claim 16, wherein the computer-readable program code stored therein causes a computer system to perform the method, and wherein the method further comprises:
    creating a tree structure based on the data using the branch and bound search procedure; and
    ordering categories associated with the tree structure based on a number of items for each category of items.

24. The computer-usable medium of claim 23, wherein the computer-readable program code stored therein causes a computer system to perform the method, and wherein the method further comprises:
    pre-filtering records associated with the data to exclude records that do not have at least one item in each category.

25. The computer-usable medium of claim 16, wherein the computer-readable program code stored therein causes a computer system to perform the method, and wherein the method further comprises:
    pre-filtering records associated with the data to exclude records that do not have at least a number of items per combination.

* * * * *

UNITED STATES PATENT AND TRADEMARK OFFICE
CERTIFICATE OF CORRECTION

| | |
|---|---|
| PATENT NO. | : 8,108,409 B2 |
| APPLICATION NO. | : 11/880390 |
| DATED | : January 31, 2012 |
| INVENTOR(S) | : Julie W. Drew et al. |

It is certified that error appears in the above-identified patent and that said Letters Patent is hereby corrected as shown below:

In the Claims:

In column 17, line 8, in Claim 1, delete "represents" and insert -- represent --, therefor.

In column 17, line 33, in Claim 7, delete "valued" and insert -- value --, therefor.

In column 18, line 14, in Claim 14, after "based" insert -- on --.

In column 18, line 36, in Claim 16, delete "Items," and insert -- items, --, therefor.

Signed and Sealed this
Twenty-third Day of April, 2013

Teresa Stanek Rea
*Acting Director of the United States Patent and Trademark Office*